US012371380B2

(12) United States Patent
Kamp et al.

(10) Patent No.: US 12,371,380 B2
(45) Date of Patent: Jul. 29, 2025

(54) PROCESS FOR PREPARING A CERAMIC ARTICLE CONTAINING SLUDGE

(71) Applicant: Harbour Stone B.V., Willemstad (NL)

(72) Inventors: Korstiaan Petrus Willem Kamp, Oude-Tonge (NL); Gert Jan De Gier, Harderwijk (NL)

(73) Assignee: Harbour Stone B.V., Willemstad (NL)

( * ) Notice: Subject to any disclaimer, the term of this patent is extended or adjusted under 35 U.S.C. 154(b) by 1386 days.

(21) Appl. No.: 16/969,360

(22) PCT Filed: Feb. 12, 2019

(86) PCT No.: PCT/NL2019/050090
§ 371 (c)(1),
(2) Date: Aug. 12, 2020

(87) PCT Pub. No.: WO2019/160409
PCT Pub. Date: Aug. 22, 2019

(65) Prior Publication Data
US 2021/0047239 A1 Feb. 18, 2021

(30) Foreign Application Priority Data

Feb. 13, 2018 (NL) .................................. 2020429
Feb. 13, 2018 (NL) .................................. 2020431

(51) Int. Cl.
| | | |
|---|---|---|
| *C04B 33/32* | (2006.01) | |
| *A23K 50/90* | (2016.01) | |
| *C02F 11/13* | (2019.01) | |
| *C04B 33/04* | (2006.01) | |
| *C04B 33/132* | (2006.01) | |
| *C04B 33/30* | (2006.01) | |
| *A23K 10/20* | (2016.01) | |

(52) U.S. Cl.
CPC .......... *C04B 33/1321* (2013.01); *A23K 50/90* (2016.05); *C02F 11/13* (2019.01); *C04B 33/04* (2013.01); *C04B 33/30* (2013.01); *C04B 33/32* (2013.01); *A23K 10/20* (2016.05); *C04B 2235/349* (2013.01); *C04B 2235/656* (2013.01)

(58) Field of Classification Search
CPC ...... C04B 2235/3418; C04B 2235/349; C04B 2235/48; C04B 2235/606; C04B 2235/65; C04B 2235/656; C04B 2235/96; C04B 33/04; C04B 33/1305; C04B 33/131; C04B 33/1321; C04B 33/1357; C04B 33/14; C04B 33/30; C04B 33/32; C04B 35/01; C04B 35/62204; C04B 35/6266; C04B 35/62675; C04B 35/6303; C04B 35/632; Y02P 40/60; C02F 11/13; A23K 10/20; A23K 50/90

See application file for complete search history.

(56) References Cited

U.S. PATENT DOCUMENTS 4,047,883 A    9/1977  Waters

FOREIGN PATENT DOCUMENTS

| AU | 708171 | * | 7/1999 | ......... C04B 33/1357 |
| CN | 106904809 A | * | 6/2017 | ........... B02C 19/068 |
| JP | H10120459 | | 5/1998 | |

OTHER PUBLICATIONS

Technology options for faecal sludge management in developing countries: Benefits and revenue from reuse to Singh et.al Environmental Technology & Innovation vol. 7, Apr. 2017, pp. 203-218 (Year: 2017).*
Search Report and Written Opinion from Application No. NL2020431 dated May 4, 2018 (12 pages).
International Preliminary Report on Patentability from Application No. PCT/NL2019/050090 dated Jan. 31, 2020 (6 pages).
Tay, J-H, "Bricks Manufactured from Sludge," Journal of Environmental Enginee, American Society of Engineers, Apr. 1, 1987, pp. 278-284.
Lin, et al., "Use of Sewage Sludge Ash as Brick Material," Journal of Environmental Engineering, Oct. 1, 2001 pp. 922-927.

* cited by examiner

*Primary Examiner* — Shuangyi Abu Ali
(74) *Attorney, Agent, or Firm* — Troutman Pepper Locke LLP; Ryan A. Schneider; Jacob M. Burr

(57) ABSTRACT

The invention relates to a process for the preparation of a ceramic article containing industrial, domestic or natural sludge, the ceramic article, and treated domestic or natural sludge suitable as raw material for the production of the ceramic article. The sludge (which definition excludes digestate that is obtained from a Municipal Solid Waste (MSW) process comprising liquefaction of the organic fraction of MSW by addition of one or more enzymes) has been pretreated by a process comprising the optional step of drying the sludge to a moisture content of at most 10% by weight, resulting in dried sludge, and heating the sludge or dried sludge in a spouting bed incinerator and reducing the content of organic matter to less than 5% by weight. The invention furthermore relates to a process wherein the pretreatment comprises using the domestic or natural sludge as a food source for larvae.

17 Claims, No Drawings

PROCESS FOR PREPARING A CERAMIC ARTICLE CONTAINING SLUDGE

TECHNICAL FIELD

The present invention relates to a process for preparing a ceramic article containing sludge, a ceramic article, and treated sludge suitable as raw material for the production of a ceramic article.

BACKGROUND

Ceramic articles such as fired clay bricks are long-lasting and strong building materials. In traditional fired bricks, sand and clay are the main ingredients. Both are naturally occurring materials, and their composition is variable. Especially the water content of clay varies. It is known that clay can comprise even up to 50% of water.

The incorporation of various types of waste as additives in the manufacture of brick has received a lot of attention. Recycling of waste generated from industrial, agricultural or domestic activities as building materials appears to be a solution for economic design of a building as well as for environmental pollution problems. Also natural sludge dredged from rivers, channels, open sea and harbors and the like may be a source of waste for which recycling would be desirable.

Sludge is a common waste material to be incorporated in building materials. As indicated, sludge can arise from many different origins. Domestic sludge (which includes agricultural sludge) is mainly organic and biodegradable, in contrast to industrial sludge, which is often in inorganic form (e.g. marble sludge, stone sludge, ceramic sludge). Organic components of industrial sludge typically are not biodegradable. Another form of sludge is natural sludge, which may—similar to domestic sludge—contain organic and biodegradable components. Domestic sludge is associated with human residential waste, and includes for example sewage sludge, sludge from waste water treatment plants or other forms of treatment of human residential waste. Domestic and natural sludge typically comprises a high quantity of water and biodegradable organic matter. Typically, the water content lies between 60 and 90%. The dry content of organic matter typically lies between 40-80% by weight of the dry matter. Industrial sludge may comprise organic matter that is combustible. The industrial sludge that is used in the present invention may have a dry content of combustible organic matter in the range of 40-80% by weight of the dry matter.

The term domestic sludge excludes digestate obtained from a Municipal Solid Waste (MSW) process comprising liquefaction of the organic fraction of MSW by addition of one or more enzymes, such as the enzymatic treatment of household waste described in WO2011/032557.

Typically, a process for the preparation of a ceramic article containing sludge comprises the steps of a) mixing clay with sludge resulting in a mixture, b) optionally adding water to the mixture, c) shaping the mixture, d) drying the shaped mixture, and e) firing the shaped mixture at baking conditions, resulting in a ceramic article.

Such a process for the preparation of a ceramic article containing sludge is known from e.g. U.S. Pat. No. 4,112,033, which describes a method of utilizing sewage and/or industrial sludge for making bricks or other ceramic articles. Sludge is mixed with clay to form a mixture of approximately 30-50% sludge. After extrusion and cutting or shaping, the articles are dried in a dryer and fired in a kiln. In the kiln, the organic portion of the sludge incorporated into the bricks being fired will be oxidized, resulting in dead air spaces which improve the insulating properties of the bricks. Such dead air spaces however also lead to increased moisture absorption by the bricks.

The more sludge there is incorporated into the shaped articles, the more porous the resulting fired product becomes. This generally results in an increased water absorption and therefore a decreased suitability of the ceramic article for outdoor use, for example as a facing brick. Chances of damage during freezing of the absorbed water increase. Also, the physical properties, e.g. the compressive strength of such porous products are generally inferior compared to standard bricks.

It is known from e.g. Tay in J. Environ. Eng. 113 (1987), p278, that sludge can be pretreated by heating before mixing with clay. During the heat treatment, organic matter and water are removed. After this removal, the heated sludge is mixed with clay, shaped, and fired to form a brick. Due to this order of steps the organic matter is burned off before the brick is shaped. The resulting brick is less porous than bricks made from domestic sludge that has not been pretreated. Nevertheless, the water absorption of the bricks from Tay gradually increased when the amount of domestic sludge was increased from 0 to 50% by weight. The compressive strength continuously decreased.

It is speculated that the heat treatment in Tay is performed at conditions at which the inorganic materials in the domestic sludge are sintered or turned into glass. Such materials assumably do not aid in the strength of the ceramic products. Porosity and lack in compressive strength therefore appears to be an inherent problem when using domestic sludge.

Despite the many scientific studies and various patent publications, ceramic articles and in particular fired bricks containing substantial amounts of sludge are rarely seen, especially not for use outdoors. This is not for lack of interest. One may only speculate, but obviously the increased porosity and the decrease of compressive strength do not help.

It is an objective of the present invention to produce ceramic articles containing sludge that are suitable for use outdoors, e.g. as a facing brick.

SUMMARY

According to the present invention, the process for preparing a ceramic article containing sludge, comprises the steps of a) mixing clay with sludge resulting in a mixture, wherein the amount of sludge comprises at least 20% by weight of the mixture, with optionally 10% by weight of additives and the remainder being clay, b) optionally adding water to the mixture, c) shaping the mixture, d) drying the shaped mixture, e) firing the shaped mixture at a temperature of 900-1200° C., resulting in a ceramic article, wherein the sludge has been pretreated by a process comprising the steps of i) optionally drying the sludge to a moisture content of at most 10% by weight, resulting in dried sludge, ii) heating the sludge or the dried sludge in a spouting bed incinerator and reducing the content of organic matter to less than 5% by weight, preferably less than 3% by weight, more preferably less than 1% by weight wherein the sludge may be domestic sludge, natural sludge or industrial sludge, provided that domestic sludge excludes digestate that is obtained from a Municipal Solid Waste process comprising liquefaction of the organic fraction of MSW by addition of one or more enzymes.

DETAILED DESCRIPTION

A spouting bed incinerator is a form of Dynamic Thermal Oxidation (DTO). Incineration in a spouting bed incinerator is a dynamic process. The air speed and the temperature inside the combustion chamber of the incinerator ensure the "cutting" of the feedstock. The shape of the combustion chamber provides the thermal driven circulation, whereby the feedstock particles undergo thermal treatment over their entire surface area. The combination of the air velocity, temperature, specific gravity and specific weight of the particles regulate the residence time and the point of "unloading" of the processed particles. Typically the feedstock, by itself or with added fuel, has a caloric value of at least 4MJ.

Spouting bed incinerators are known. For instance, in RU2249763C1 fire-chambers with spouting beds are described that may be used in heat power engineering. The fire-chamber with a spouting beds of this reference contains a cylindrical combustion-chamber made with the height of its cylindrical part making 10-15% of the height of the conical part, and at an angle of inclination of the conical part wall in respect to the vertical equal to 10-20°, and the height of the conical part making 3-5 its average internal diameters. Under the combustion chamber there is an ignition chamber with the tangential connecting pipes to supply air and flue gases and the injector for a preliminary ignition of a comminuted fuel. As the speeds of a gas stream along the height of the combustion chamber are various, then particles of the fuel depending on their sizes are located in the conical part according to values of the speeds of their liquefaction and airborne. The particles of fuel burning down are flying to a stabilizer-deflector made in the form of a radial shutters. At that a part of them is deflected and refunded into the conical part. The particles having passed through the stabilizer-deflector together with the flue gases are driven into a high-temperature cyclone separator located outside the fire-chamber. A spouting bed incinerator is also known from U.S. Pat. No. 4,047,883A and art described therein. Moreover, spouting bed incinerators are used for incineration of (hazardous) waste, e.g., by the EMGroup in Geleen, The Netherlands, (http://www.emgroup.nl/en/products/incinerators/).

Municipal Solid Waste may be sorted, wherein non-biodegradable materials such as metal and/or plastic items are removed. The remaining organic fraction may then be digested by biodegradation (though microbes and/or added enzymes) to form biomethane and digestate.

MSW may also be treated unsorted, as disclosed in WO2011/032557, comprising the liquefaction of the organic fraction of unsorted MSW by addition of one or more enzymes. This step may also be used in respect of sorted MSW. This step is different from the conventional biodegradation step wherein biomethane is formed; liquefaction is specifically meant to liquefy the organic materials before digestion by biodegradation for the formation of biomethane.

For the purpose of this patent application, the digestate obtained by a process comprising liquefaction of the organic fraction of MSW by addition of one or more enzymes is excluded from the scope of the claim.

In other words, with domestic sludge is meant to include sewage sludge, sludge from waste water treatment plants and human residential waste from which non bio-degradable materials have been removed and the remaining organic fraction may have been digested by biodegradation.

In the prior art, processes are known in which slight, e.g. 5%, amounts of domestic sludge are used in a process for the preparation of a ceramic article. Such amounts of sludge arguably do not effectively contribute to the reduction of environmental pollution problems. By using at least 20% by weight of sludge, preferably at least 40% by weight of sludge, the impact of sludge waste on the environment can be reduced as compared to processes for the preparation of a ceramic article in which less sludge is used. Of particular interest are ceramic articles for outdoor use. Accordingly, preferably up to 60% by weight of sludge is used. Above 60% of sludge, the properties of the ceramic articles are generally not satisfactory for use outdoors. In other words, preferably the amount of sludge in step a) comprises between 40-60% by weight, with optionally up to 10% by weight of additives and the remainder being clay, as these ranges provide the optimum balance between the reduction of the impact of sludge waste on the environment and the properties of the ceramic articles. For the avoidance of doubt, the amount of sludge corresponds to the amount prior to the pretreatment of steps i) and ii).

Preferably the additive is chosen from the group consisting of sand, glass, glass dust, colorant, rice husk ash, fly ash, kaolin, paper ash and/or combinations thereof. Addition of glass dust or sand for example reduces shrinkage of the ceramic articles during firing. Other additives such as rice husk ash and fly ash are waste materials, the use of which reduces their impact on the environment.

Water can optionally be added to the mixture in step b) to improve the processability of the mixture. The shaping of step c) may become easier. The amount of water to be added, if any, depends on the moisture content of the ingredients, i.e. the sludge and the clay, and can be determined by the person skilled in the art. Firing of the shaped mixture is performed at a temperature of between 900-1200° C.

At lower temperatures, materials are not sintered adequately. Higher temperatures require the needless input of heat energy without increasing the properties of the bricks. The duration of firing depends on the temperature and the required properties of the ceramic article and its determination lies within the skills of the person skilled in the art.

Due to the pretreatment steps organic matter is burned off before the brick is shaped. The resulting brick is less porous than bricks made from sludge that has not been pretreated. Moreover, the use of a spouting bed incinerator, as explained hereafter, reduces the occurrence of sintering.

During the optional drying in step i) the moisture content of the sludge is reduced to at most 10% by weight. Due to this separate drying step, water vapor and burned organic compounds can be removed from the sludge largely separately and do not have to be separated at a later point, which causes difficulties with removing the organic volatiles from the released water vapor.

Preferably the drying in step i) is carried out by heating the domestic sludge at a temperature of between 50-200° C. It will be clear to a person skilled in the art that the heating time required to arrive at the required moisture content will depend on the temperature and manner of drying. At lower temperatures, water is removed too slowly. This adds to the total production time of the ceramic article and is therefore not desirable. Higher temperatures mainly increase the temperature of the removed water vapor without adding to the speed of evaporation.

More preferably the drying in step i) is carried out by heating the domestic sludge at a temperature of between 100-110° C. This range provides for the optimum balance between speed of water evaporation and input of heat energy.

In case the organic matter is biodegradable, as in domestic and natural sludge, alternatively, the optional drying in step i) is performed by using the domestic or natural sludge as a food source for larvae. In this respect, it is known from e.g. Diener et al. in Resources, Conservation and Recycling 88 (2014), 32 that using faecal sludge as a medium for rearing insect larvae is a potential treatment and resource recovery option. The larvae remove part of the amount of organic matter and convert the organic matter to e.g. chitosan, lipids, and proteins. The larvae can be used as a conventional protein and fat source in animal feed, e.g. in chicken feed or fish feed. Not only do the larvae remove part of the amount of organic matter, moreover, they remove a large amount of water.

Use of larvae as optional drying step (or additional drying step) increases the economic attractiveness of the entire process for preparing a ceramic article containing domestic or natural sludge, which in its turn benefits the environment. A considerable part of the domestic or natural sludge, organic as well as inorganic material, is re-used rather than being released into the environment as waste. An unexpected advantage is that the domestic or natural sludge is dried to the desired level of less than 10% moisture content during feeding by the larvae. Advantageously, during the feeding process, the larvae grow by taking up the organic matter as well as part of the moisture, whereas the other part of the moisture evaporates. Typically, after feeding for about 15-25 days at a temperature of between 20-30° C., the moisture content is reduced to only about 5% while the larvae are fully grown. Thus, drying of the domestic sludge is an advantageous side-effect of the larvae feeding process, which eliminates the need for a separate drying process.

Preferably, the larvae are larvae of the black soldier fly. Unlike many fly species neither the larvae nor adult flies are considered pests or vectors. The larvae have been well studied in literature (see e.g. Diener et al.), and have for example been used as chicken and fish feed.

Preferably, in step i) the content of organic matter is reduced to less than 20% by weight, more preferably less than 10% by weight, most preferably less than 5% by weight. The more the content of organic matter is reduced, the more organic compounds from the domestic or natural sludge are recovered as a valuable material, and the less energy needs to be put into removing the remaining organic material from the domestic or natural sludge in step ii).

The sludge or the dried sludge, in case of domestic or natural sludge preferably dried by larvae, is subjected to incineration in a spouting bed incinerator. Surprisingly, the use of a spouting bed incinerator results in the full incineration of organic materials, without the side effect of sintering of the inorganic materials. The product, captured by use of a cyclone or similar gas/solid separator, can be applied in bricks without fear of inferior properties. Thus all organic materials are burned off, that would otherwise result in a porous material with high water absorption characteristics and inferior strength.

The content of organic matter is reduced to less than 5%, preferably less than 3% more preferably less than 1% by weight of the total content of dry matter. The less organic material remains in the sludge, the less porous the resulting product will be. It will be clear to a person skilled in the art that the time of heat treatment needed to arrive at a content of organic matter of less than 5% by weight will depend on the dimensions of the combustion chamber of the incinerator, on the temperature and the residence time in the spouting bed incinerator. The temperature may be controlled by the caloric nature of the feedstock and the nature and amount of additional feedstock used as fuel. Low calorific feedstock can be "upgraded" with a high calorific waste stream such as, for example, but not exclusively, mixed plastics from sorting residue, gases and generated diesel from a "Plastic to Fuel" process, etc. As starter fuel and emergency fuel, conventional fuel can be used, for example natural gas or oil. Preferably, the process is run without the use of conventional fuel.

If the temperature is not high enough and/or the residence time is not long enough, then the organic material is not adequately burned off. Typically, the temperature in the spouting bed incinerator is in the range of 900 to 1250° C. Typically, the residence time in the spouting bed incinerator is in the range of 1 to 10 seconds. Gas velocity is at least 10 m/s. The capture of the final processed material typically takes place by means of cyclones which are driven by the combustion air. The cyclones transport the processed material via airflow and gravity e.g., to a storage or a further transport operation.

Preferably, the firing of the mixture in step e) is carried out at a temperature of between 900-1100° C. This temperature provides for optimal brick properties.

Preferably the temperature of the mixture in step e) is gradually increased to the firing temperature over a period of 10-40 hours. For example, a temperature profile may be applied, in which the temperature is first increased over a period of 2-8 hours to between 500-700° C., and kept at this temperature for 2-8 hours. Then the temperature is further increased over a period of 2-8 hours to a temperature between 700-900° C. and kept at this temperature for 2-8 hours, and finally the temperature is increased to the firing temperature over a period of 2-8 hours. Firing may then be performed for 2-10 hours. The gradual increase of the temperature prevents sudden changes in the material which can cause cracking or even explosion. It is especially important that the quartz inversion temperature at 573° C. is passed slowly.

The current invention also provides for a ceramic article produced by the process disclosed above and/or one or more of its preferred embodiments.

Preferably the ceramic article is a brick.

Preferably the ceramic article contains at least 20% by weight, more preferably at least 40% by weight more preferably from 40 to 60% by weight domestic sludge (calculated on the domestic sludge prior to treatment). Finally, the current invention provides for treated sludge suitable as raw material for the production of a ceramic article, obtained by i) using domestic or natural sludge as a food source for larvae and at the same time drying the sludge to a moisture content of at most 10% by weight, ii) heating the sludge or the dried sludge in a spouting bed incinerator and reducing the content of organic matter to less than 5% by weight, preferably less than 3% by weight, more preferably less than 1% by weight provided that domestic sludge excludes digestate obtained from a Municipal Solid Waste process comprising liquefaction of the organic fraction of MSW by addition of one or more enzymes.

The examples, advantageous and preferred embodiments present above regarding the process for preparing a ceramic article from sludge according to the invention are equally applicable to these further aspects of the invention.

Example 1

In a typical process according to the invention, 100 kg of domestic sludge with a moisture content of about 75% by weight, and a ratio of organic versus inorganic dry matter of about 65:35 of the wet sludge was heated at a temperature of 105° C. for 24 hours. This resulted in 26 kg of dried sludge. The dried sludge was then heated in a spouting bed incinerator operating at a temperature in the range of 900 to 1250° C., a residence time of 1 to 10 seconds and at a gas velocity of at least 10 m/s. This resulted in around 8 kg of treated domestic sludge, wherein the content of organic matter was reduced to less than 1% by weight.

Example 2

In addition, 100 kilogram of domestic sludge with a moisture content of about 75% by weight, and a ratio of organic versus inorganic dry matter of about 65:35 of the wet sludge was used as a food source for larvae of the black soldier fly.

Larvae of the black soldier fly were added on top op 100 kilogram of domestic sludge. The domestic sludge and the larvae were maintained at a temperature of about 25° C. for about 20 days. During this time, the weight of the larvae increases to approximately a thousandfold of their initial weight. After this, well-fed larvae were removed and a reduced amount of domestic sludge with a moisture content of about 5% and a content of organic matter of about 5% remained.

After removing the larvae from the domestic sludge, the sludge dried by larvae was heated in a spouting bed incinerator operating at a temperature in the range of 900 to 1250° C., a residence time of 1 to 10 seconds and at a gas velocity of at least 10 m/s. This resulted in around 8 kg of treated domestic sludge, wherein the content of organic matter was reduced to less than 1% by weight.

Example 3

50% by weight (calculated as untreated sludge) of the treated sludge from Example 1 or Example 2, and 50% by weight of clay were mixed and put into a brick mold. The product in the mold was slowly heated to 575° C. over a period of 8 hours, and kept at this temperature for 4 hours. The temperature was then slowly increased 750° C. over a period of 2 hours, and kept at this temperature for 4 hours. Finally the temperature was increased over a period of 4 hours to a firing temperature of 1000° C. and fired at this temperature for 6 hours. After firing, the brick was slowly cooled to room temperature by turning off the heating of the oven.

The porosity and compressive strength of the bricks are comparable to the properties of conventional fired clay facing bricks, which is therefore an improvement vis-à-vis bricks made with domestic sludge as disclosed in the prior art.

The invention claimed is:

1. A process for preparing a ceramic article containing sludge comprising:
   heating sludge in a spouting bed reactor operating at a temperature in a range of between 900-1250° C., a residence time of from 1 to 10 seconds and with gas velocity of at least 10 m/s until the content of organic matter is less than 5% by weight;
   mixing clay with the sludge resulting in a mixture, wherein the amount of sludge comprises at least 20% by weight of the mixture;
   shaping the mixture;
   drying the shaped mixture; and
   firing the shaped mixture at a temperature of between 900-1200° C., resulting in a ceramic article.

2. The process according to claim 1, wherein the sludge is domestic sludge, selected from sewage sludge, sludge from waste water treatment plants and human residential waste from which non bio-degradable materials have been removed and the remaining organic fraction may have been digested by biodegradation.

3. The process according to claim 1, wherein in mixing the clay with the sludge resulting in the mixture, the amount of sludge comprises at least 40% by weight of the mixture.

4. The process according to claim 1, wherein in mixing the clay with the sludge resulting in the mixture, the mixture further comprises at least one additive in an amount of up to 10% by weight; and
   wherein the additive is selected from the group consisting of sand, glass, glass dust, colorant, rice husk ash, fly ash, kaolin, paper ash and combinations thereof.

5. The process according to claim 1 further comprising drying the sludge by heating at a temperature of between 50-200° C. such that the sludge has a moisture content of at most 10% by weight prior to heating the sludge.

6. The process according to claim 1 further comprising drying the sludge to a moisture content of at most 10% by weight prior to heating the sludge;
   wherein the sludge is selected from the group consisting of domestic and natural sludge; and
   wherein drying the sludge comprises using the sludge as a food source for larvae.

7. The process according to claim 6, wherein the larvae are larvae of the black soldier fly.

8. The process according to claim 6, wherein in drying the sludge to a moisture content of at most 10% by weight prior to heating the sludge, the content of organic matter is reduced to less than 20% by weight.

9. The process according to claim 1, wherein heating the sludge comprises heating the sludge until the content of organic matter is reduced to less than 1% by weight.

10. The process according to claim 1, wherein firing the shaped mixture comprises firing the shaped mixture at a temperature of between 900-1100° C.

11. The process according to claim 10, wherein firing the shaped mixture further comprises gradually increasing the firing temperature over a period of between 10-40 hours.

12. The process according to claim 1, wherein the sludge is selected from the group consisting of domestic sludge, natural sludge, and industrial sludge; and
   wherein if domestic sludge, it excludes digestate that is obtained from a Municipal Solid Waste process (MSW) comprising liquefaction of the organic fraction of MSW by addition of one or more enzymes.

13. The process according to claim 12 further comprising drying the sludge to a moisture content of at most 10% by weight prior to heating the sludge.

14. The process according to claim 12 further comprising adding water to the mixture prior to shaping the mixture.

15. The process according to claim 12 further comprising:
   drying the sludge to a moisture content of at most 10% by weight prior to heating the sludge; and
   adding water to the mixture prior to shaping the mixture;

wherein mixing the clay with the sludge results in a mixture having up to 10% by weight of additives and the remainder being clay.

16. The process according to claim 14, wherein mixing the clay with the sludge results in a mixture having up to 10% by weight of additives and the remainder being clay.

17. A process for preparing a ceramic article containing sludge comprising:

drying sludge to a moisture content of at most 10% by weight and until the content of organic matter is reduced to less than 20% by weight;

heating the dried sludge in a spouting bed reactor operating at a temperature in a range of between 900-1250° C., a residence time of from 1 to 10 seconds and with gas velocity of at least 10 m/s until the content of organic matter is less than 5% by weight;

mixing clay, one or more additives, and the heated sludge to form a mixture;

wherein the one or more additives are selected from the group consisting of sand, glass, glass dust, colorant, rice husk ash, fly ash, kaolin, paper ash and combinations thereof;

wherein the amount of the one or more additives comprises up to 10% by weight of the mixture; and wherein the amount of sludge comprises at least 40% by weight of the mixture;

shaping the mixture;

drying the shaped mixture; and firing the shaped mixture at a temperature of between 900-1200° C., resulting in a ceramic article;

wherein the sludge is selected from the group consisting of domestic sludge, natural sludge, and industrial sludge; and wherein if domestic sludge, it excludes digestate that is obtained from a Municipal Solid Waste process comprising liquefaction of the organic fraction of MSW by addition of one or more enzymes.

* * * * *